(12) United States Patent
Courtel (10) Patent No.: US 9,917,505 B2
(45) Date of Patent: Mar. 13, 2018

(54) PULSE WIDTH MODULATION CONTROLLER ARCHITECTURES

(71) Applicant: Atmel Corporation, San Jose, CA (US)

(72) Inventor: Karl Jean-Paul Courtel, Reze (FR)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 15/260,246

(22) Filed: Sep. 8, 2016

(65) Prior Publication Data

US 2016/0380529 A1 Dec. 29, 2016

Related U.S. Application Data

(60) Division of application No. 14/589,767, filed on Jan. 5, 2015, now abandoned, which is a continuation of application No. 13/331,411, filed on Dec. 20, 2011, now Pat. No. 8,929,110.

(51) Int. Cl.
| | | |
|---|---|---|
| *H02M 1/42* | (2007.01) | |
| *H02M 3/156* | (2006.01) | |
| *H02M 1/08* | (2006.01) | |
| *H02M 1/00* | (2006.01) | |

(52) U.S. Cl.
CPC ............... *H02M 1/42* (2013.01); *H02M 1/08* (2013.01); *H02M 1/4225* (2013.01); *H02M 3/156* (2013.01); *H02M 2001/0009* (2013.01); *Y02B 70/126* (2013.01); *Y02P 80/112* (2015.11)

(58) Field of Classification Search
CPC ...... H02M 1/4225; H02M 1/42; H02M 5/451; H02M 2001/0016; H02M 2001/0019; H02M 2001/0022; H02M 2001/0042; H02M 3/156

USPC ............ 363/89; 323/205, 207, 282–285, 299
See application file for complete search history.

(56) References Cited

U.S. PATENT DOCUMENTS

| | | |
|---|---|---|
| 8,698,409 B2 | 4/2014 | Naruo et al. |
| 2006/0013026 A1 | 1/2006 | Frank et al. |
| 2008/0094861 A1 | 4/2008 | Wang |
| 2008/0246444 A1 | 10/2008 | Shao et al. |
| 2009/0146618 A1 | 6/2009 | Adragna |
| 2011/0221402 A1 | 9/2011 | Park et al. |

(Continued)

OTHER PUBLICATIONS

Atmel Corporation, "AVR221: Discrete PID Controller," 2006, to be published by the USPTO, 10 pages.

*Primary Examiner* — Kyle J Moody
(74) *Attorney, Agent, or Firm* — Fish & Richardson P.C.

(57) ABSTRACT

Systems, apparatuses, and techniques for pulse width modulation (PWM) are described. A described system includes a circuit that contains an inductor and a transistor that controls current through the inductor based on a PWM signal to produce an output; and a controller to provide the PWM signal, which includes PWM cycles that include on-durations and off-durations. The controller can receive a first signal indicating an input voltage that is applied to the inductor, receive a second signal indicating a current through the inductor, use an on-duration parameter value to control the on-duration, determine a maximum off-duration of the off-durations corresponding to the PWM cycles occurring within a first voltage cycle, the first voltage cycle being defined between two consecutive zero-crossing events as indicated by the first signal, and adjust the on-duration parameter value for a second, subsequent voltage cycle based on the maximum off-duration to regulate the output voltage.

20 Claims, 11 Drawing Sheets (56) References Cited

U.S. PATENT DOCUMENTS

2012/0201063 A1    8/2012   Sugawara
2013/0010508 A1    1/2013   Courtel

PULSE WIDTH MODULATION CONTROLLER ARCHITECTURES

CLAIM OF PRIORITY

This application is a divisional of U.S. patent application Ser. No. 14/589,767, filed on Jan. 5, 2015, which is a continuation and claims priority to U.S. patent application Ser. No. 13/331,411, filed on Dec. 20, 2011, the entire contents of each of which are hereby incorporated by reference.

TECHNICAL FIELD

This patent document relates generally to electronic power systems, such as a switch mode power supply (SMPS), that uses a pulse width modulation (PWM) controller architecture to regulate the power supplied to one or more devices.

BACKGROUND

Electronic power systems can include a power factor corrector (PFC) or a flyback convertor that uses PWM to regulate the power supplied to one or more devices. For example, a power system can include a controller that provides a PWM signal to command a switch (e.g., a power transistor) of a PFC, which in turn, controls the charging of a coil of the PFC. The controller can use an analog-to-digital converter (ADC) to sample the output voltage of the PFC to adjust the pulse length of the PWM signal to regulate the output of the PFC.

SUMMARY

This document describes, among other things, technologies relating to PWM controller architectures. In one aspect, a described controller architecture includes a first input interface to receive a first signal indicating a zero detection of an input voltage that is applied to an inductor of a circuit, the circuit being configured to produce an output signal with an output voltage; a second input interface to receive a second signal indicating a zero detection of a current through the inductor; circuitry to provide a pulse width modulation (PWM) signal that controls, via a switch, a current through the inductor based on an on-duration parameter value, the PWM signal including PWM cycles that each include an on-duration and an off-duration, the on-duration parameter value controlling an on-state duration of the switch, and where a start of each on-duration is triggered by a current trigger event indicated by the second signal; circuitry to determine a maximum off-duration of the off-durations corresponding to the PWM cycles occurring within a first voltage cycle, the first voltage cycle being defined between two consecutive zero-crossing events as indicated by the first signal; and circuitry to adjust the on-duration parameter value for a second, subsequent voltage cycle based on the maximum off-duration to regulate the output voltage.

This and other implementations can include one or more of the following features. Implementations can include a timer circuitry that includes a timer counter, circuitry to capture a value of the timer counter based on the current trigger event, and circuitry to reset the timer counter based on the current trigger event. Implementations can include a register, circuitry to perform a comparison between a value of the register and the value of the timer counter, and circuitry to load the register with the value of the timer counter based on a result of the comparison. The circuitry to determine the maximum cycle duration can be configured to access the register. The circuitry to adjust the on-duration parameter value can be configured to adjust the on-duration parameter value further based on a maximum time that the inductor takes to demagnetize into a half period of input power during the first voltage cycle. The current trigger event can correspond to a zero-current trigger event. The input voltage can be supplied by an alternating current source. The circuitry to adjust the on-duration parameter value can be programmed with a maximal voltage value associated with the alternating current source. The circuitry to monitor durations of the PWM cycles can include circuitry to time off-durations of the PWM cycles. The circuitry to determine the maximum off-duration can include circuitry to record the largest off-duration observed during the first voltage cycle. The circuitry to determine the maximum off-duration can include circuitry to capture a maximum duration of a PWM cycle that occurs during the first voltage cycle. The maximum off-duration can be determined based on the maximum duration and the on-duration parameter value in use during the maximum duration.

In another aspect, a system can include a circuit that contains an inductor and a transistor that controls current through the inductor based on a PWM signal, the circuit being configured to produce an output signal with an output voltage; and a controller configured to provide the PWM signal. The PWM signal can include PWM cycles that each include an on-duration and an off-duration. The controller can be configured to receive a first signal indicating an input voltage that is applied to the inductor, receive a second signal indicating a current through the inductor, use an on-duration parameter value to control each on-duration, cause a start of each on-duration based on a current trigger event indicated by the second signal, determine a maximum off-duration of the off-durations corresponding to the PWM cycles occurring within a first voltage cycle, the first voltage cycle being defined between two consecutive zero-crossing events as indicated by the first signal, and adjust the on-duration parameter value for a second, subsequent voltage cycle based on the maximum off-duration to regulate the output voltage.

This and other implementations can include one or more of the following features. The controller can include timer circuitry that includes a timer counter. The controller can include circuitry to capture a value of the timer counter based on the current trigger event. The controller can include circuitry to reset the timer counter based on the current trigger event. The controller can include a register, circuitry to perform a comparison between a value of the register and the value of the timer counter, and circuitry to load the register with the value of the timer counter based on a result of the comparison. In some implementations, the controller is configured to access the register. The maximum cycle duration can be based on a value of the register. In some implementations, the controller is configured to adjust the on-duration parameter value further based on a maximum time that the inductor takes to demagnetize into a half period of input power during the first voltage cycle. In some implementations, the current trigger event corresponds to a zero-current trigger event. In some implementations, the input voltage is supplied by an alternating current source. The controller can be programmed with a maximal voltage value associated with the alternating current source.

In another aspect, a system can include a circuit including an inductor and a transistor that controls current through the inductor based on a PWM signal, the circuit being configured to produce an output signal with an output voltage; processor that is configured to provide an on-duration parameter value; and a controller, communicatively coupled with the processor, configured to provide the PWM signal, the PWM signal including PWM cycles that each include an on-duration and an off-duration. The controller can be configured to receive a first signal indicating an input voltage that is applied to the inductor, receive a second signal indicating a current through the inductor, use the on-duration parameter value to control each on-duration, cause a start of each on-duration based on a current trigger event indicated by the second signal, determine a maximum off-duration of the off-durations corresponding to the PWM cycles occurring within a first voltage cycle, the first voltage cycle being defined between two consecutive zero-crossing events as indicated by the first signal. The processor can be configured to adjust the on-duration parameter value for a second, subsequent voltage cycle based on the maximum off-duration to regulate the output voltage.

In yet another aspect, a technique can include receiving a first signal indicating a zero detection of an input voltage that is applied to an inductor of a circuit. The circuit can be configured to produce an output signal with an output voltage that is responsive to the input voltage and an output of the inductor. The technique can include receiving a second signal indicating a zero detection of a current through the circuit's inductor. The technique can include providing a PWM signal that controls a current through the circuit's inductor based on an on-duration parameter value. The PWM signal can include PWM cycles that each include an on-duration and an off-duration. The on-duration parameter value can control the on-duration. A start of each on-duration can be triggered by a current trigger event indicated by the second signal. The technique can include monitoring durations of the PWM cycles of the PWM signal. The technique can include determining a maximum off-duration of the off-durations corresponding to the PWM cycles occurring within a first voltage cycle. The first voltage cycle can be defined between two consecutive zero-crossing events as indicated by the first signal. The technique can include adjusting the on-duration parameter value for a second, subsequent voltage cycle based on the maximum off-duration to regulate the output voltage.

Particular embodiments of the technology described in this document can be implemented so as to realize one or more of the following advantages. The technology can be used to eliminate a requirement for an ADC to measure the output voltage, which can reduce the overall bill of material (BOM) of a product, decrease power consumption, or both. For example, a microcontroller based on the described technology for a PFC can be fabricated without an ADC. The technology can be applied to devices where an output voltage can be determined from a un-magnetization time of a coil.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes, among other things, PWM architectures including PWM controllers and PWM retriggering mechanisms that do not require an analog-to-digital converter (ADC) to sample output voltages. PWM architectures can be used to provide regulated output voltages to loads. Load variations can cause a PWM controller to adjust PWM pulse widths so that a stable output voltage can be applied on the load. Power input variations can also cause a PWM controller to adjust PWM pulse widths, but generally the input voltage is controlled by a power provider within a country having known alternating current (AC) power generation standards and can be considered stable. A PWM controller can control a PFC circuit to regulate an AC source. A PFC output voltage can be composed of a continuous voltage plus a rectified sinusoidal component with the same frequency as the rectified input voltage. To stabilize a regulation loop of a PWM architecture that controls the PFC output voltage, a measurement of PFC output voltage is typically required at each cycle at the same position of the main supply period. The PFC output voltage measurement is generally performed via an ADC. However, the PFC output voltage can be inferred based on a demagnetization time of a coil and monitoring current flow through the coil. The PWM conditional retrigger mode described herein can provide at the end of each PFC voltage cycle the selected retrigger time value for a processor to calculate the output voltage of a PFC circuit without using an ADC to measure the PFC output voltage. Thus, a device with a conditional retrigger mode can regulate the output voltage of a PFC circuit without using such an ADC.

Figure 1:
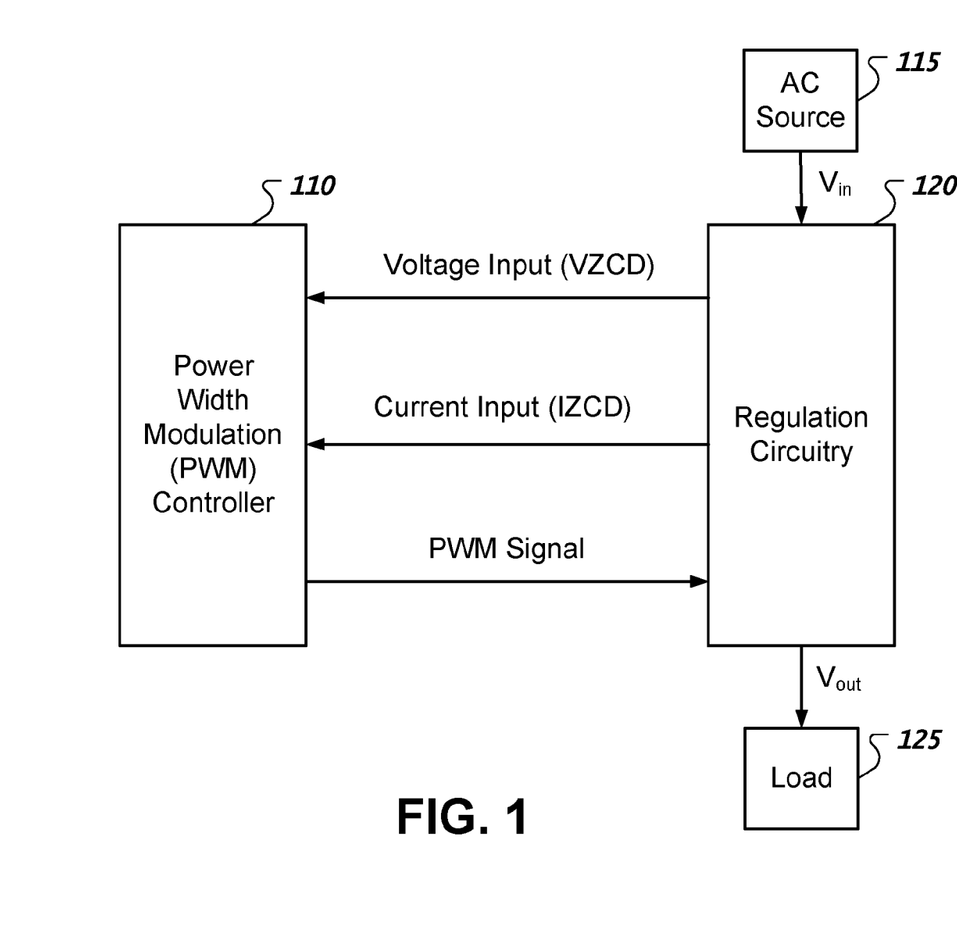
FIG. 1 is a simplified schematic diagram of an example PFC driver architecture.

FIG. 1 is a simplified schematic diagram of an example PFC driver architecture. The architecture includes a PWM controller 110 and regulation circuitry 120. The regulation circuitry 120 is coupled with an AC source 115 and load 125. Various examples of the regulation circuitry 120 include a PFC, a flyback converter, or a SMPS system such as a buck converter or a boost converter. In some implementations, the AC source 115 includes rectification circuitry to rectify an AC input. In other implementations, the regulation circuitry 120 includes rectification circuitry to rectify the output from the AC source 115.

The PWM controller 110 can be configured to reduce significantly the sinusoidal component from the AC source 115 to produce a nearly constant voltage output for a circuit such as a direct current (DC) circuit. For example, the regulation circuitry 120 takes a rectified sinusoidal input voltage $V_{in}$ from the AC source 115 and produces an regulated output voltage $V_{out}$ with a significantly reduced sinusoidal component to the load 125. The regulation circuitry 120 can include an inductor and a switch such as a transistor that controls current through the inductor. The PWM controller 110 monitors the input voltage (e.g., the VZCD input) applied to the regulation circuitry 120 and the current (e.g., the IZCD input) through the inductor. The PWM controller 110 provides the regulation circuitry 120 with a PWM signal that allows charging of the inductor by allowing current to pass through the inductor from the AC source 115 via the switch. The PWM controller 110 includes a retriggering mechanism that, based on monitoring the IZCD input, iteratively recharges the inductor after each demagnetization. A typical PWM controller would require an analog-to-digital converter (ADC) to sample the output voltage of the regulation circuitry 120 in order to adapt the pulse widths of the PWM signal. However, the PWM controller 110 of FIG. 1 does not require an ADC, but rather infers the output voltage of the regulation circuitry 120 based on the discharge property of the inductor during a voltage cycle to adapt the pulse widths of the PWM signal.

In some implementations, the PWM controller 110 includes a PWM module and a central processing unit (CPU). The PWM module can monitor IZCD and generate PWM pulses within the PWM signal. The CPU can determine how to adapt the pulse widths. In some implementations, the PWM controller 110 is a microcontroller that is fabricated as an integrated circuit.

Figure 2A:
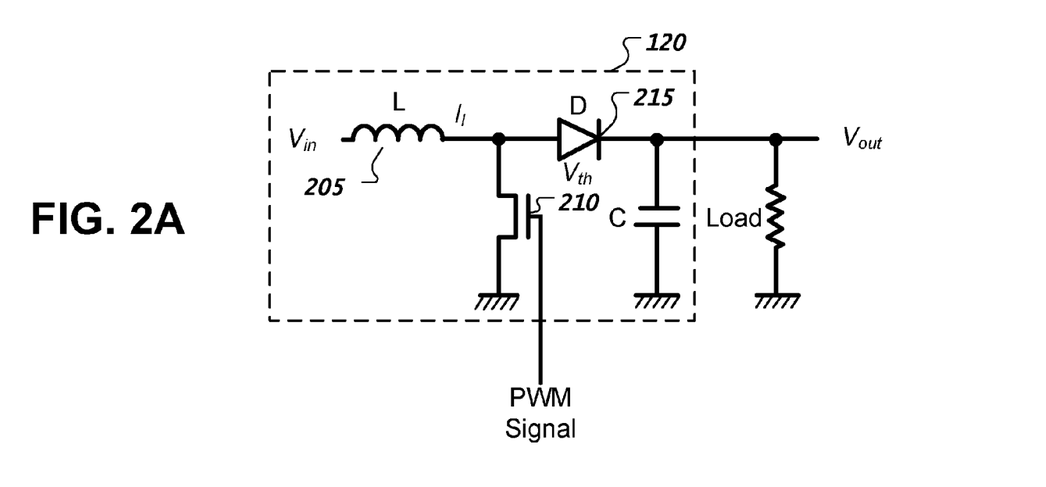
FIG. 2A is a simplified schematic diagram of example regulation circuitry of FIG. 1.

FIG. 2A is a simplified schematic diagram of the regulation circuitry 120 of FIG. 1. Regulation circuitry 120 can include an inductor 205 with an inductance L, transistor 210, and diode 215 with a threshold voltage $V_{th}$, and a capacitor C. The regulation circuitry 120 drives a load which is represented by a resistor. The regulation circuitry 120 takes an input voltage $V_{in}$ and produces an output voltage $V_{out}$. The PWM controller 110 turns the transistor 210 on for an on-duration of $t_{on}$ such that current flows through the inductor 205, thereby charging the inductor 205. After the on-duration, the transistor 210 is turned off for at least an off-duration of $t_{off}$. Therefore, a PWM cycle is defined to include an on-duration and a subsequent off-duration. The end of the PWM cycle corresponds with a zero flow of current through the inductor 205. Detecting an end of the PWM cycle via an IZCD input associated with the inductor 205, the PWM controller 110 turns the transistor 210 on again for another on-duration.

Figure 2B:
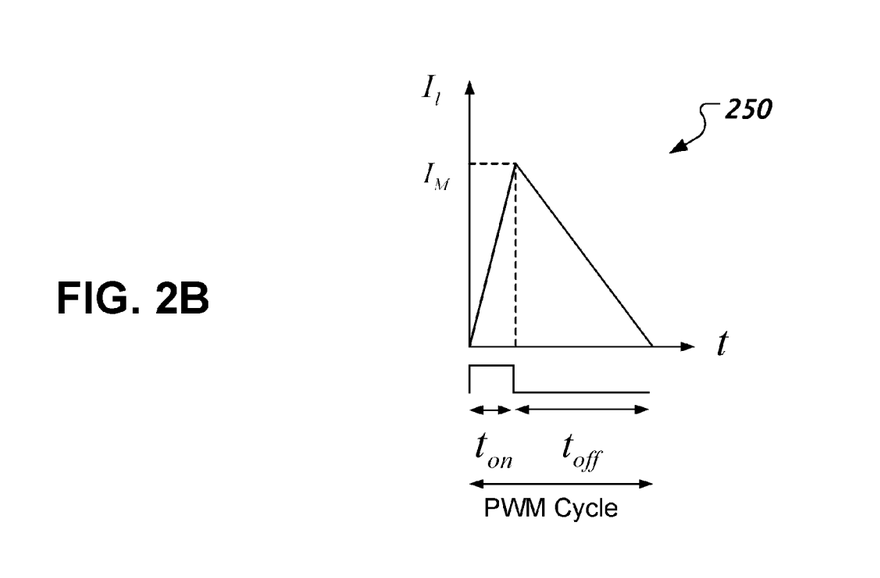
FIG. 2B is a graph depicting current flow across the inductor of FIG. 2A during a PWM cycle.

FIG. 2B is a graph 250 depicting current flow across the inductor of FIG. 2A during a PWM cycle. A PWM cycle includes the $t_{on}$ on-duration and the $t_{off}$ off-duration. The graph 250 has the current $I_l$ flow through the inductor 205 on the vertical axis and time on the horizontal axis. As depicted, $I_M$ denotes the maximal current flow during a PWM cycle, which can be calculated by:

$$I_M = \frac{V_{in}}{L} \int_0^{t_{on}} dt = \frac{V_{in}}{L} t_{on}$$

The PWM controller 110 can be programmed with values for $V_{in}$, L, and the threshold voltage $V_{th}$. The PWM controller 110 can be programmed with constant values such as L and. The output voltage $V_{out}$ of the regulation circuitry 201 can be calculated by $$V_{out} = V_{in} + L\frac{di}{dt} - V_{th} = V_{in} + L\frac{I_M}{t_{off}} - V_{th} = V_{in} + L\frac{V_{in}}{L}\frac{t_{on}}{t_{off}} - V_{th}$$

and by rearranging the above equations yields the following for $V_{out}$ $$V_{out} = V_{in}\left(1 + \frac{t_{on}}{t_{off}}\right) - V_{th}.$$

Based on this equation, the PWM controller 110 can be programmed to compute $V_{out}$ rather than use an analog-to-digital convertor to measure $V_{out}$. Note that $t_{off}$ is all the more long than $V_{out}$-$V_{in}$ is low. This property can be used to detect a max $V_{in}$ input value as a reference measurement point. Considering a constant PFC output voltage, the $t_{off}$ time corresponding to the time $V_{in}$ is maximum is the largest $t_{off}$ time that is observed during a voltage cycle. To make a calculation of the $V_{out}$ voltage, a microcontroller records the maximum $t_{off}$ value observed within a voltage cycle. In some implementations, the $V_{out}$ voltage is based on a measurement of a maximum $t_{off}$ time observed during a voltage cycle, a $V_{in}$ value that is based on a maximum voltage value from a power provider minus two times a threshold voltage of a rectifier bridge diode, applied $t_{on}$ time, and the threshold voltage $V_{th}$. For example, with the maximal absolute value of $V_{in}$ which is set by a country's power generation standards (e.g 120V in the United States, 230V in countries such as France and the United Kingdom based on values including a maximum value observed for $t_{off}$ during an observation cycle (e.g., voltage cycle), a predetermined value for $t_{on}$, and the maximal absolute value for $V_{in}$ (e.g., 120 V), the PWM controller 110 can compute the average obtained $V_{out}$ during the observation cycle. Based on the average obtained $V_{out}$ value, the PWM controller 110 can compute a new value for $t_{on}$ for a subsequent observation cycle.

Figure 3:
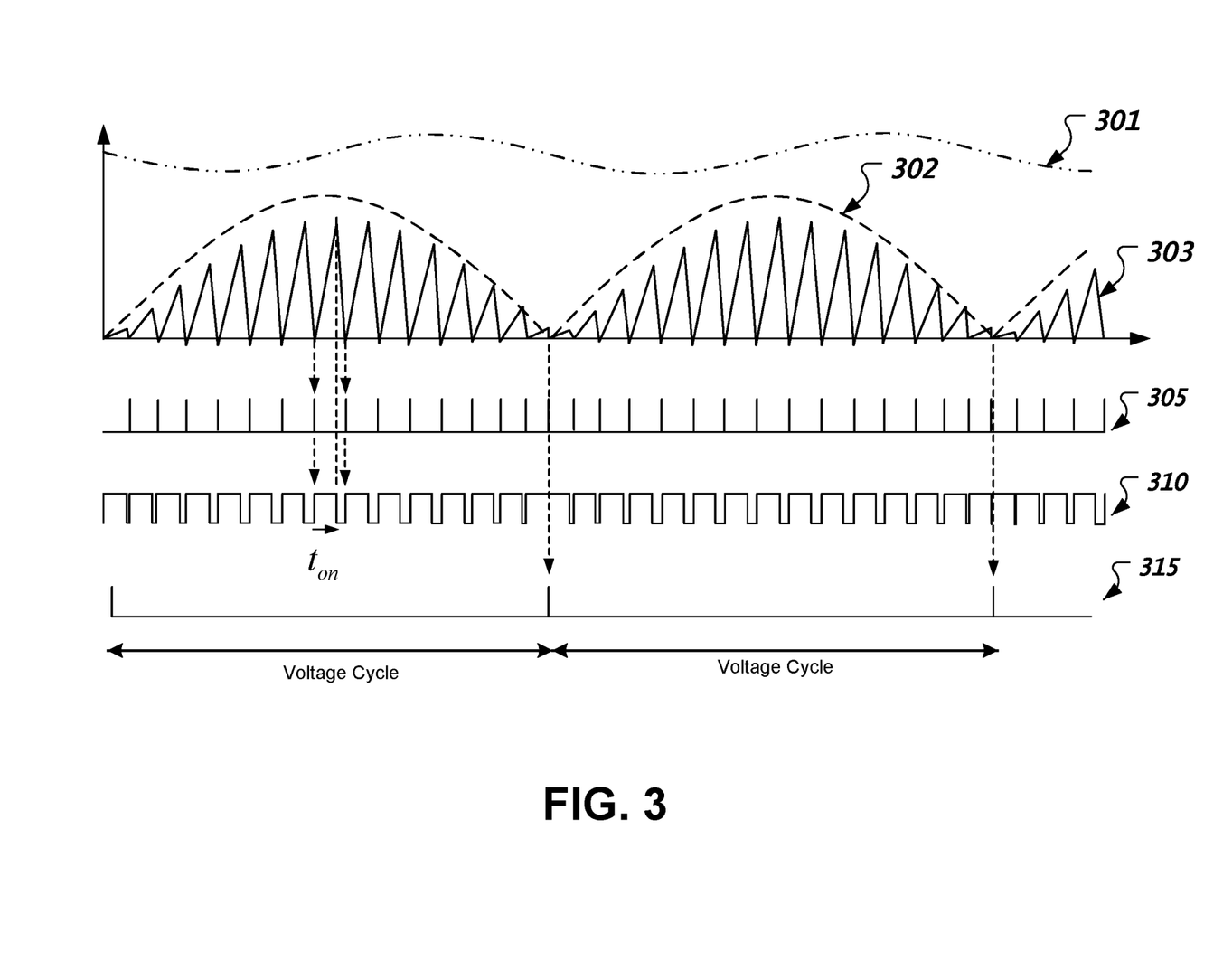
FIG. 3 are waveforms illustrating a relationship among input voltage, output voltage, inductor current, PWM signal, and trigger events.

FIG. 3 are waveforms illustrating a relationship among input voltage, output voltage, inductor current, PWM signal, and trigger events. In FIG. 3, a first waveform 301 depicts an output voltage $V_{out}$ of regulation circuitry 120, a second waveform 302 depicts an input voltage $V_{in}$ to regulation circuitry 120, and a third waveform 303 depicts an inductor current. The output of the PWM controller 110 is denoted by a PWM signal waveform 310. Voltage trigger events (e.g., zero-crossing or zero-touching events of the input voltage) are denoted by the zero-voltage-detection waveform 315. A voltage cycle is defined between two consecutive voltage trigger events of the input voltage (e.g., between consecutive pulses on the waveform 315).

Current trigger events (e.g., zero-current trigger events) are denoted by a zero-current-detection waveform 305. In some implementations, based on a current being at or sufficiently close to zero (e.g., within a tolerance range), a current trigger event can be generated. A PWM cycle is defined between two consecutive current trigger events based on a detection of zero current through the inductor of the regulation circuitry 120. Note that the pulses of the zero-current-detection waveform 305 correspond to the zeros of the waveform 303 depicting the current through the inductor of the regulation circuitry 120. Also, note that the PWM cycles are variable. Each PWM cycle includes a predetermined constant-time coil charging phase $t_{on}$ (e.g., on-duration) and a variable time coil discharging phase $t_{off}$ (e.g., off-duration). A current trigger event can be used to reinitialize a timer to start a new PWM cycle.

In some implementations, the PWM controller 110 records the longest $t_{off}$ observed in a voltage cycle. In some implementations, the PWM controller records the longest PWM cycle observed in a voltage cycle and derives the longest $t_{off}$ based on a predetermined value for $t_{on}$. At the end of each voltage cycle, the PWM controller 110 can determine the output voltage $V_{out}$ from the longest PWM cycle observed during the voltage cycle. The PWM controller 110 can use a proportional-integral-derivative (PID) controller to update the $t_{on}$ value for the next voltage cycle to regulate an output of the regulation circuitry 120. In some implementations, the regulation circuitry 120 includes a PFC and a voltage cycle can be referred to as a PFC cycle.

Figure 4:
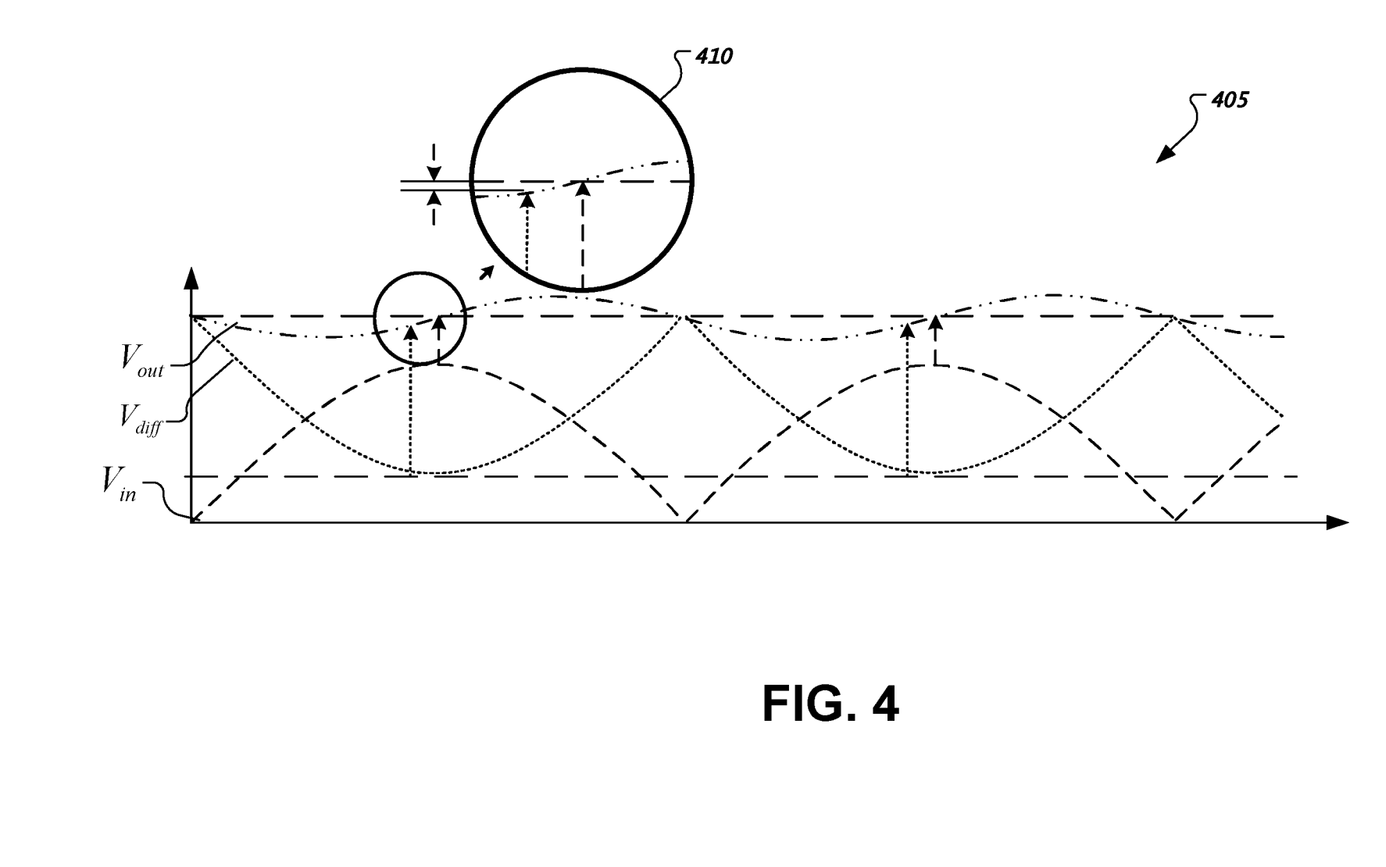
FIG. 4 is a graph depicting a voltage measurement offset error.

FIG. 4 is a graph 405 depicting a voltage measurement offset error. In FIG. 4, the graph 405 shows an input voltage $V_{in}$ over time, output voltage $V_{out}$ over time, a voltage difference ($V_{diff}=V_{out}-V_{in}$) over time. A magnified area 410 of the graph 405 shows a $t_{off}$ offset error that is caused by one or more sources. Based on a device obtaining a maximum $t_{off}$ value used to compute $V_{out}$, the $t_{off}$ offset error reflects the time of a minimum $V_{diff}$ not being exactly at a position where $V_{out}$ is at its average value and $V_{in}$ is at its maximum value. A sinusoidal component of $V_{out}$ may cause the offset error together with the resistance of the inductor combined with the resistance of the PWM transistor being in the on-state. The $t_{off}$ measurement offset error can affect a PWM controller's ability to determine accurately the average value of $V_{out}$ during a voltage cycle. For example, the sinusoidal component of $V_{out}$ can cause the time of the minimal value of $V_{diff}$ to not occur exactly at the time of the maximum value of $V_{in}$, but a slight time before. This may induce an offset error for calculated version of the $V_{out}$ value. Note that this offset error is independent of a continuous output voltage of a regulation circuitry, which is the value that is to be regulated. These two effects can be minimized by using a switch (e.g., a transistor) having a low resistance on-state and a sufficient capacitor in parallel with the load. This offset error can be characterized by component characteristics (e.g., capacitor, load, and switch characteristics) such that a PWM controller can use the characteristics to compensate for the offset error in the PWM controller's calculation of the $V_{out}$ value.

Figure 5:
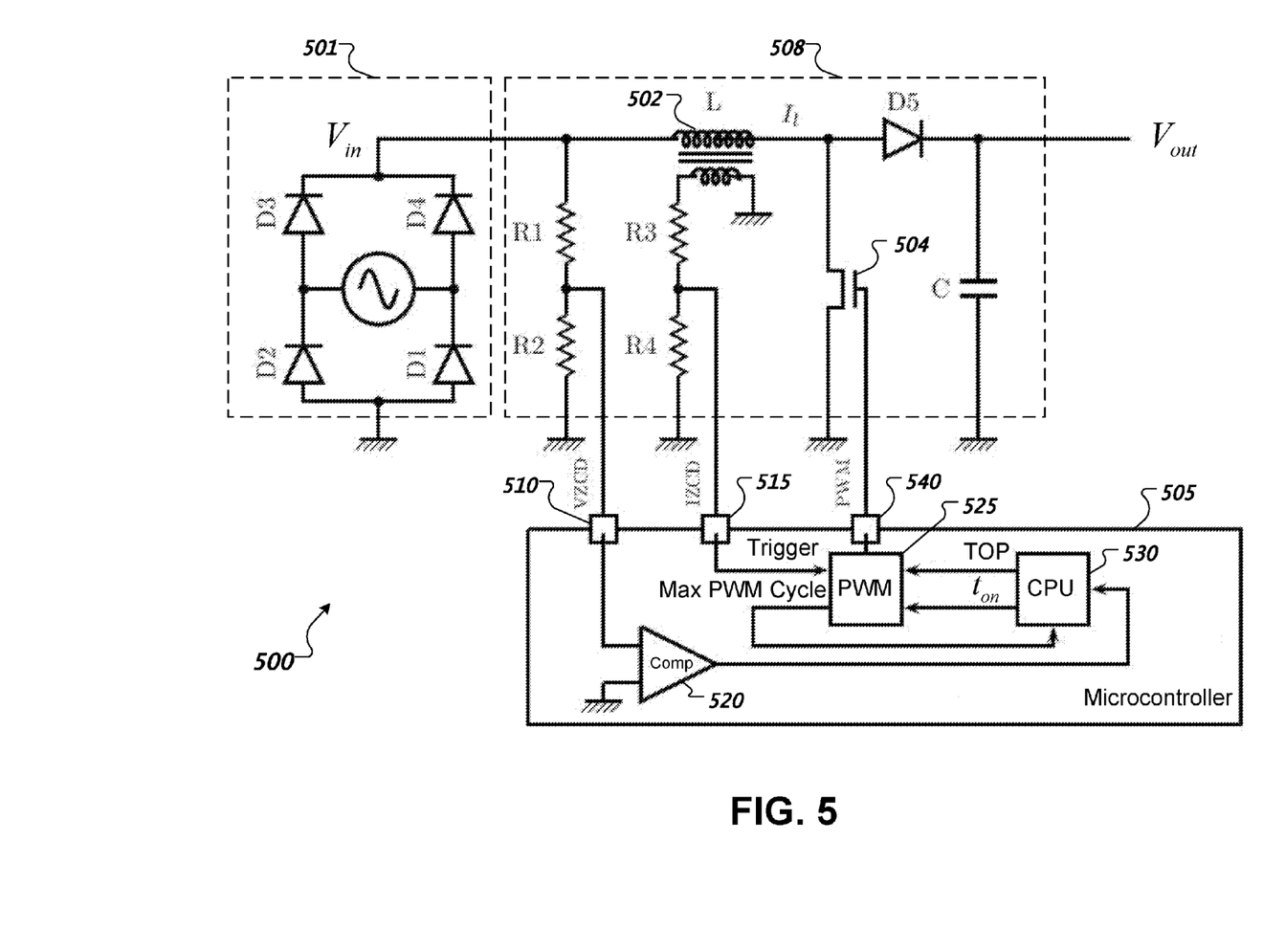
FIG. 5 is a simplified schematic diagram of an example device that includes a PFC and a microcontroller for generating a PWM signal.

FIG. 5 is a simplified schematic diagram of an example device 500 that includes a PFC and a microcontroller for generating a PWM signal. The device 500 can include an input voltage section 501, power factor corrector 508, and microcontroller 505. The power factor corrector 508 can include an inductor 502, transistor 504, diode D5, resistors (R1-R4), and a capacitor. The microcontroller 505 can control the charging of the inductor 502. The input voltage section 501 can include circuitry (e.g., a diode bridge (D1-D4)) to rectify fully an AC signal.

The microcontroller 505 includes a first input interface 510, a second input interface 515, a comparator 520, a PWM module 525, a CPU 530, and an output interface 540. For voltage trigger events, the microcontroller 505 includes an input interface 510 that is electrically coupled with a line called VZCD for detecting a zero crossing of an input voltage associated with an inductor 502 of the power factor corrector 508. For current trigger events, the microcontroller 505 includes an input interface 515 that is electrically coupled with a line called IZCD for detecting a zero-current event associated with a current into the inductor 502. Based on the timing of the voltage trigger events and the current trigger events, the microcontroller 505 controls the charging of the inductor 502 via an output interface 540 that is electrically coupled with a transistor 504 of the power factor corrector 508. Once on, the transistor 504 allows the inductor 502 to charge.

The CPU 530 can provide minimal cycle information such as an on-duration parameter value (e.g., $t_{on}$) to the PWM module 525. In some implementations, the PWM module 525 can include circuitry to produce a current trigger event when an inductor current signal indicates a zero-current flow. Based on the current trigger event, the PWM module 525 uses the on-duration parameter value to start another duration of an on-state of the transistor 504.

Based on the timing between consecutive current trigger events, the PWM module 525 captures the maximum PWM cycle value observed by the PWM module 525 during a PFC cycle, e.g., the longest PWM cycle within a PFC cycle. The PWM module 525 includes timer circuitry to time individual PWM cycles. Rather than storing individuals values, the PWM module 525 records the maximum PWM cycle duration during a voltage cycle. In some implementations, the CPU 530 provides a TOP value for downwards-counting counter circuitry included in the PWM module 525. In some implementations, the CPU 530 provides a BOTTOM value for upwards-counting counter circuitry included in the PWM module 525.

The comparator 520 compares the VZCD signal with a predetermined signal such as ground. If the comparator 520 detects that the VZCD signal crosses or at least reaches predetermined signal (0V for ground), then the comparator 520 outputs a voltage trigger event (e.g., a logical one) to the CPU 530. Based on the voltage trigger event, the CPU 530 reads the maximum PWM cycle captured by the PWM module 525 and determines a revised on-duration parameter value. The CPU 530 supplies the revised on-duration parameter value to the PWM module 525.

Figure 6:
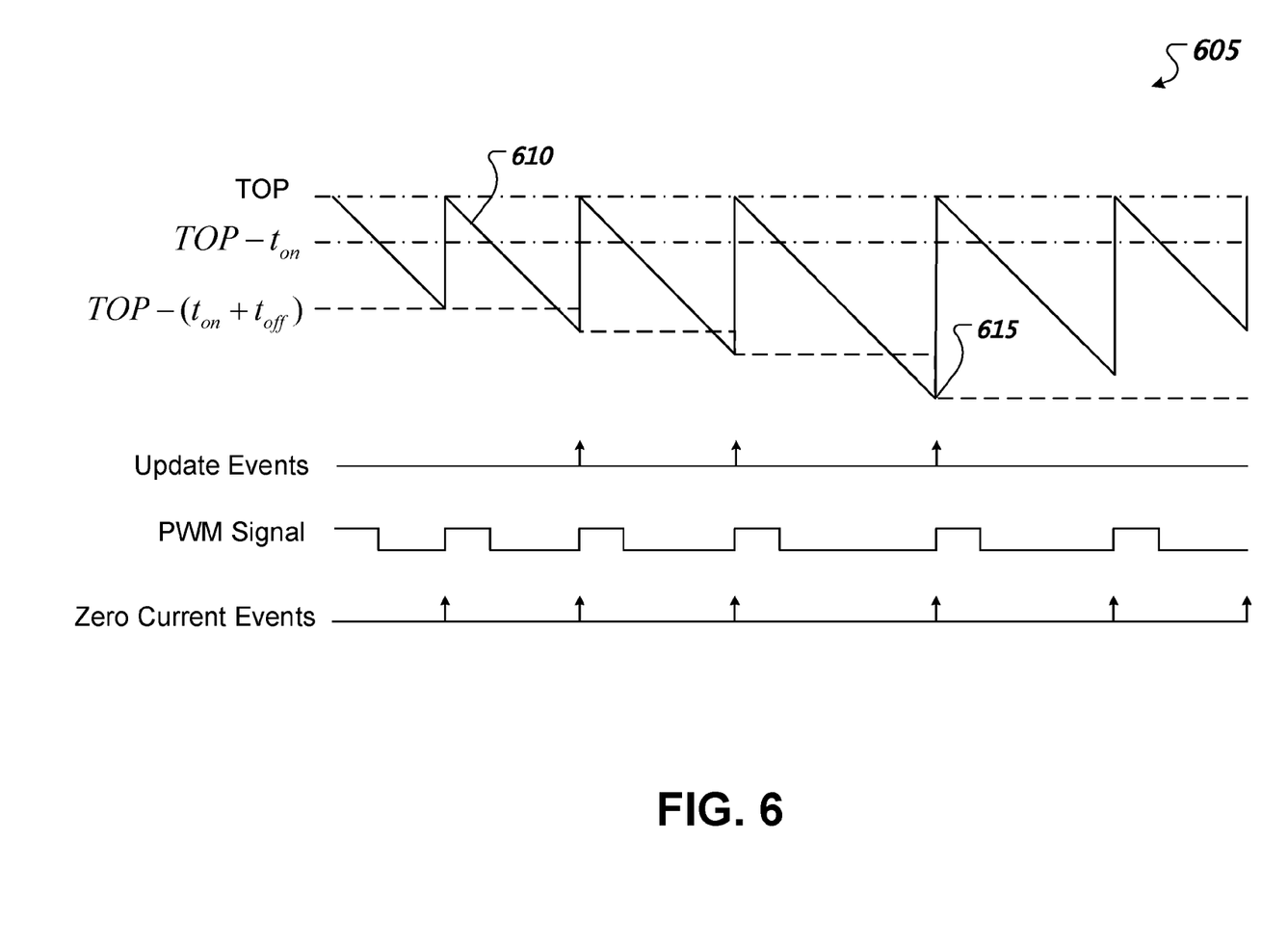
FIG. 6 are waveforms illustrating example events associated with a PWM controller that uses a downwards-counting counter.

FIG. 6 are waveforms illustrating example events associated with a PWM controller that uses a downwards-counting counter. As described above, the CPU 530 provides a TOP value to the PWM module 525. The waveforms 605 depict a first dashed line indicating the TOP value, a second dashed lined indicating the value TOP-$t_{out}$, and a third segmented dashed lined indicating different captured values of TOP-($t_{on}$+$t_{off}$). The waveforms 605 also depict a solid line 610 that indicates the timer counter value, where the timer counter starts at the TOP value and is decremented until a zero-current event (e.g., zero current flow through an inductor). The zero-current event resets the timer counter value to the TOP value. The starts of the PWM cycles of the PWM signal correspond to the zero-current events (e.g., see graph for the PWM signal). Based on selection of successively lower values for TOP-($t_{on}$+$t_{off}$), update events are generated which cause a new current TOP-($t_{on}$+$t_{off}$) value to be stored if the value is lower than the preceding captured value until the lowest value is captured (see marker 615). For example, a capture register included in a PWM controller can be responsive to the updates events to capture a value of the timer counter value. As depicted, if the value is greater than the preceding captured value (e.g., after marker 615), an update event does not occur, therefore leaving the captured valued within the capture register unchanged for a remainder of the voltage cycle, thus the captured value reflects the lowest value observed during the voltage cycle.

Figure 7:
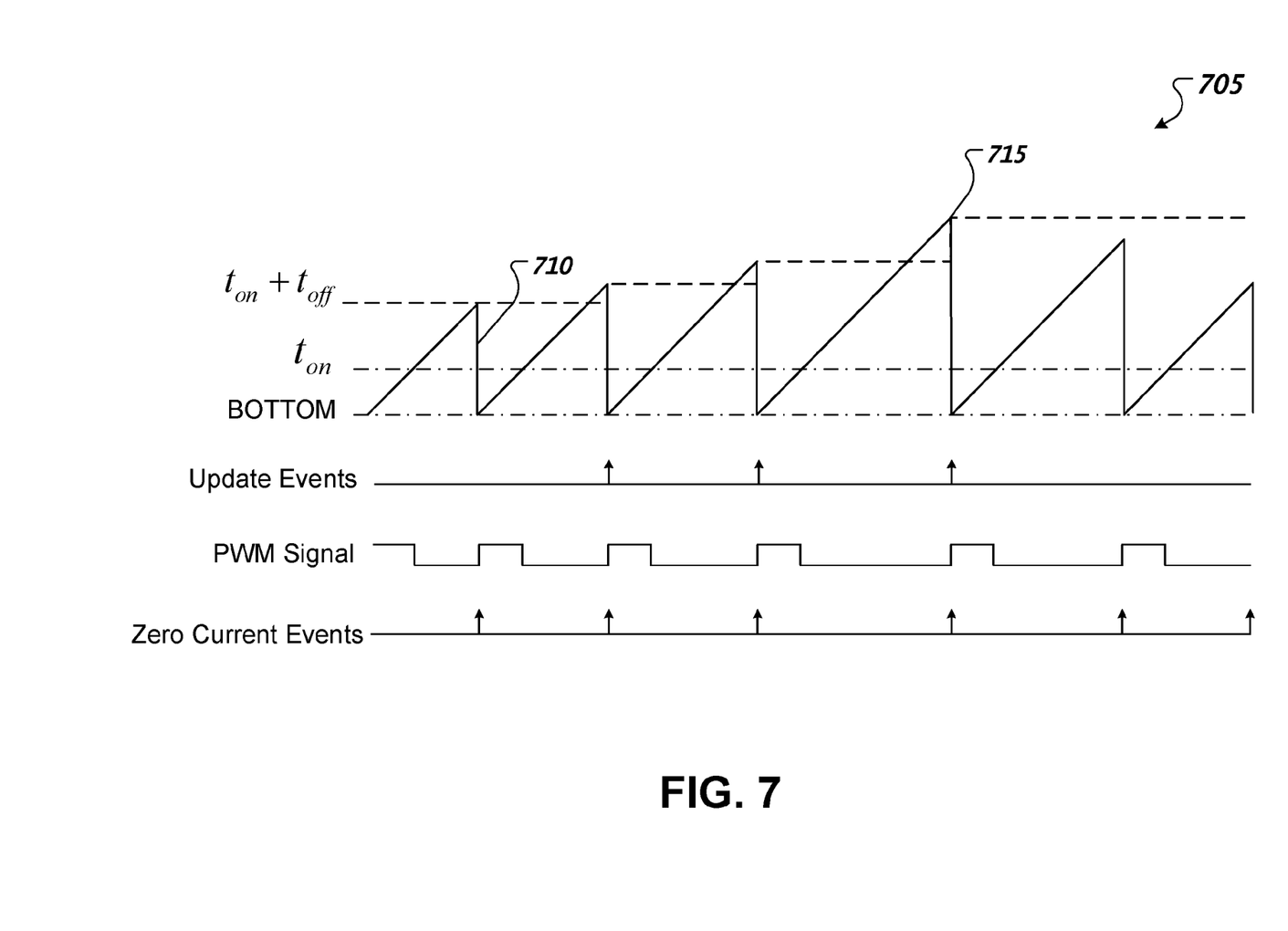
FIG. 7 are waveforms illustrating example events associated with a PWM controller that uses an upwards-counting counter.

FIG. 7 are waveforms illustrating example events associated with a PWM controller that uses an upwards-counting counter. In this example, the CPU 530 provides a BOTTOM value (e.g., zero) to the PWM module 525, rather than a TOP value. The waveforms 705 depicts a first dashed line indicating the BOTTOM value, a second dashed lined indicating the value $t_{on}$, and a third segmented dashed lined indicating different captured values of $t_{on}+t_{off}$. The waveforms 705 also depict a solid line 710 that indicates the timer counter value which starts at the BOTTOM value and is incremented until a zero-current event. The zero-current event resets the timer counter value to the BOTTOM value. The starts of the PWM cycles of the PWM signal correspond to the zero-current events (e.g., see graph for the PWM Signal). Based on selection of successively higher values for $t_{on}+t_{off}$, update events are generated which cause a new current $t_{on}+t_{off}$ value to be stored if is it is greater than the preceding captured value until the highest value has been captured (see marker 715). For example, a capture register included in a PWM controller can be responsive to the updates events to capture a value of the timer counter value. As depicted, if the value is lower than the preceding captured value (e.g., after marker 715), an update event does not occur, therefore leaving the captured valued within the capture register unchanged for a remainder of the voltage cycle, thus the captured value reflects the highest value observed during the voltage cycle.

Figure 8:
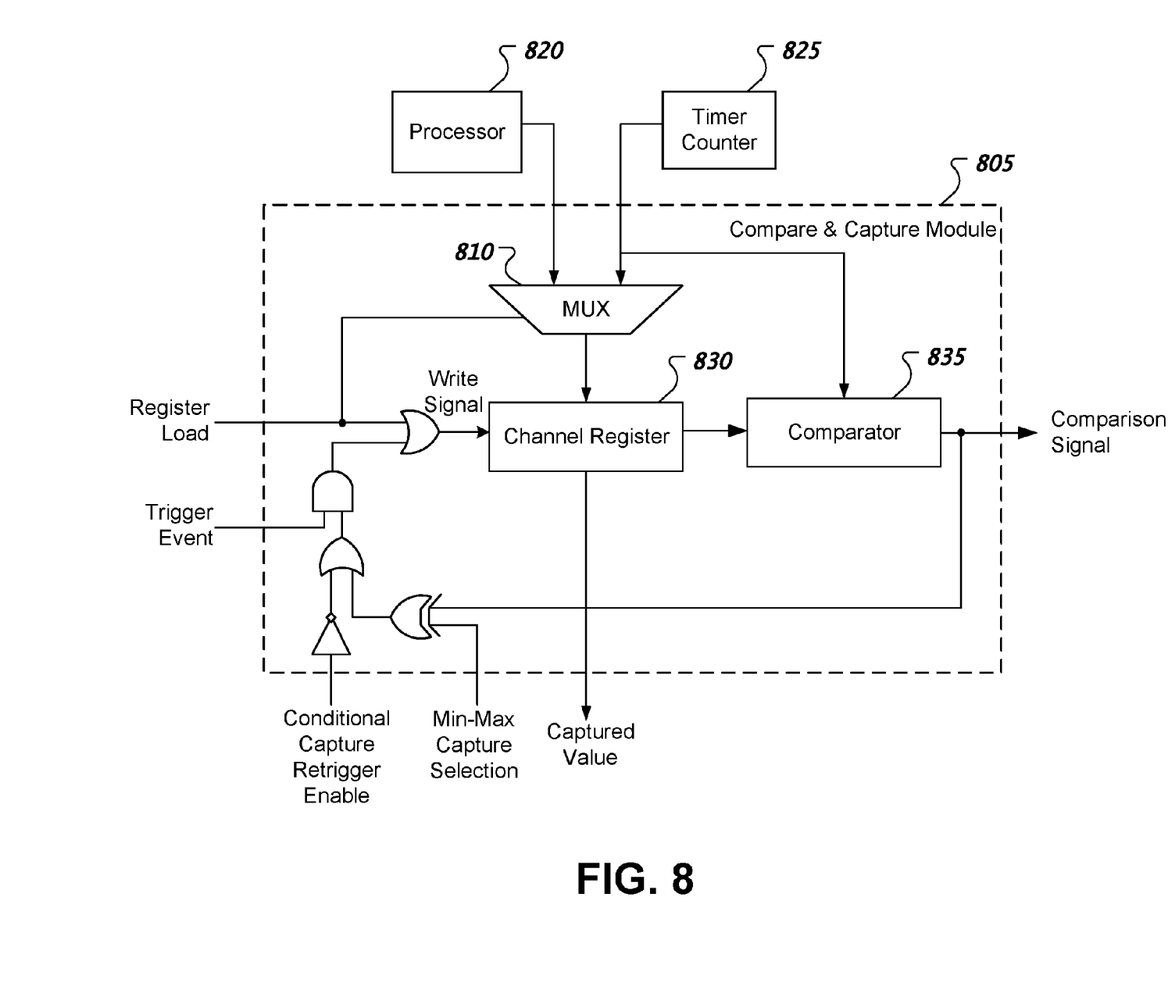
FIG. 8 is a simplified schematic diagram of an example compare and capture module architecture.

FIG. 8 is a simplified schematic diagram of an example compare and capture module architecture 805. The compare and capture module (CCM) 805 can include a multiplexer 810 that selects among inputs that include a value provided by processor 820 and a value provided by a timer counter 825. In some implementations, a processor 820 include one or more processor cores. Based on a write signal, the output of the multiplexer 810 is stored in a channel register 830 as a captured value or an initial value. A register such as the channel register 830 can include logic gates that are arranged to store digital values. The processor 820 can cause an initial value to be loaded into the channel register 830 by sending a pulse via the register load input to cause the multiplexer 810 to select an output from the processor 820 and to cause the channel register 830 to store the initial value.

A comparator 835 included in the CCM 805 is configured to compare the captured value with a value provided by the timer counter 825. In a counting-up implementation, if the value from the timer counter 825 is greater than a captured value, then an active enable signal can be produced within a comparison signal output from the comparator 835. In a counting-down implementation, if the timer value is less than a captured value, then an active enable signal can be produced within the comparison signal output form the comparator 835. Inputs including the comparison signal, min-max capture selection input (which can invert the logic level of an enable signal), trigger event input (e.g., zero-current event), and the conditional capture retrigger enable signal via the logic shown in FIG. 8 can generate a write signal that causes the value provided by the timer counter 825 to be selected by the multiplexer 810 and, subsequently, loaded into the channel register 830. The captured value stored in the channel register 830 can be provided to the processor 820. For example, based on an end of a PFC cycle, the processor 820 can read the captured value from the channel register 830 to adjust the on-duration parameter value.

The processor 820 can provide the min-max capture selection to the CCM 805. In some counting-up timer counter implementations, where a comparator output is high when a timer counter is greater than or equal to a channel register content, within the min-max capture selection input, a logical zero indicates that the maximum trigger event time should be captured, whereas a logical one indicates that the minimum trigger event time should be captured. In some implementations, the processor 820 provides the conditional capture retrigger enable signal, where a logical one indicates that the conditional capture retrigger is enabled.

A conditional retriggering mode can be implemented within the CCM 805 using several logical gates (e.g., the four logical gates depicted by FIG. 8). A resynchronized trigger input event can be conditioned to a state of comparison between a value of the channel register 830 and a value of the timer counter 825. In at least one min-max capture selection state, the trigger event can cause a new value to be written into the channel register 830, if at time of the retrigger event, the timer counter value is less than the channel register value.

Figure 9:
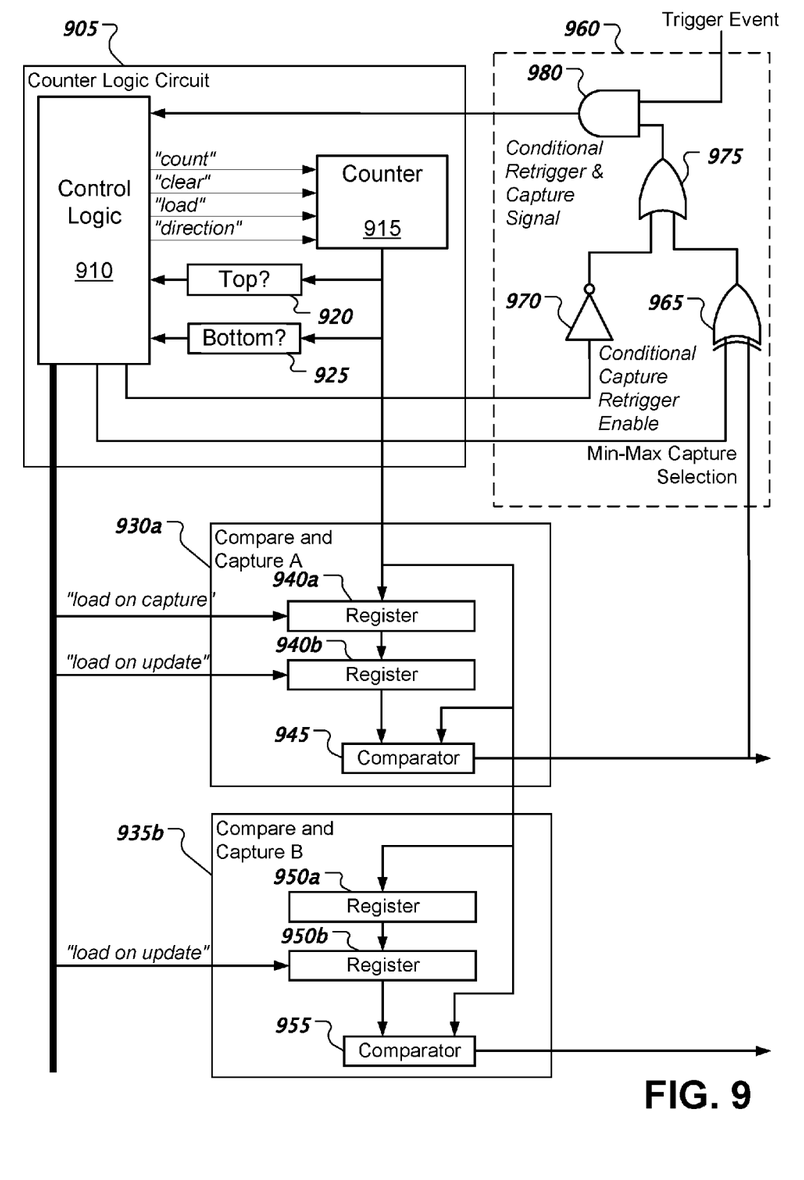
FIG. 9 shows another example of a counter and capture architecture.

FIG. 9 shows another example of a counter and capture architecture for a PWM architecture. A counter and capture architecture can include a counter logic circuit 905 and one or more CCMs such as CCM-A 930a and CCM-B 930b. The counter logic circuit 905 can include control logic 910 and a counter 915. The control logic 910 can set a counting direction of the counter 915, load an initial value into the counter 915, clear the counter 915, or cause the counter 915 to provide its current value. The counter logic circuit 905 can include circuitry 920 to detect whether the counter 915 has reached a TOP value. The counter logic circuit 905 can include circuitry 925 to detect whether the counter 915 has reached a BOTTOM value. The control logic 910 can provide a load on capture signal to CCM-A 930a to cause the CCM-A 930a to load a value from the counter 915 into a first register 940a. The control logic 910 can provide a load on update signal to the CCM-A 930a to cause the CCM-A 930a to load a value from the first register 940a into a second register 940b of the CCM-A 930a. A comparator 945 can compare the value of the second register 940b with a value from the counter 915. In some cases, where comparator 945 detects the condition that counter is greater than or equal to second register, a trigger event causes a current value from counter 915 to be loaded into the first register 940a of the CCM-A 930a (e.g., causes the control logic 910 to send the load on capture signal to CCM-A 930a). In some implementations, the comparator 945 determines whether a value of the second register 940b of the CCM-A 930a is greater than or equal to a value from the counter 915. In some implementations, the comparator 945 determines whether a value of the second register 940b of the CCM-A 930a is less than or equal to a value from the counter 915

CCM-B 930b includes a first register 950a, a second register 950b, and a comparator 955. The first register 950a can store a value from the counter 915. The CCM-B 930b can be used to control the pulse width of a PWM signal. For example, the counter logic circuit 905 can load an on-duration parameter value into the second register 950b. Based on the counter value being less than the on-duration parameter value, the comparator 955 can output a signal to control a transistor to be in an on-state to allow current to flow through an inductor.

A detection circuit 960 performs logic operations on its input signals to produce a conditional retrigger and capture signal to the control logic 910. The input signals include a trigger event signal, a min-max capture selection signal, a comparison result signal, and a conditional capture retrigger enable signal. The control logic 910 can provide the min-max capture selection signal and the conditional capture retrigger enable signal to the detection circuit 960. The CCM-A 930a can provide comparison results to the detection circuit 960. The detection circuit 960 can include logic elements such as an XOR 965, an inverter 970, an OR 975, and an AND 980. In some implementations, a logical one produced by the AND 980 via the conditional retrigger and capture signal causes the control logic 910 to send a load on capture signal to CCM-A 930a such that the first register 940a of CCM-A loads a current value from the counter 915.

In some implementations, within the min-max capture selection input, a logical one indicates that the minimum trigger time should be captured, whereas a logical zero indicates that the maximum trigger time should be captured. In some implementations, the processor 820 provides the conditional capture retrigger enable signal, where a logical one indicates that the conditional capture retrigger is enabled, to capture the min or max retrigger time value depends on the Min-Max Capture selection.

Figure 10:
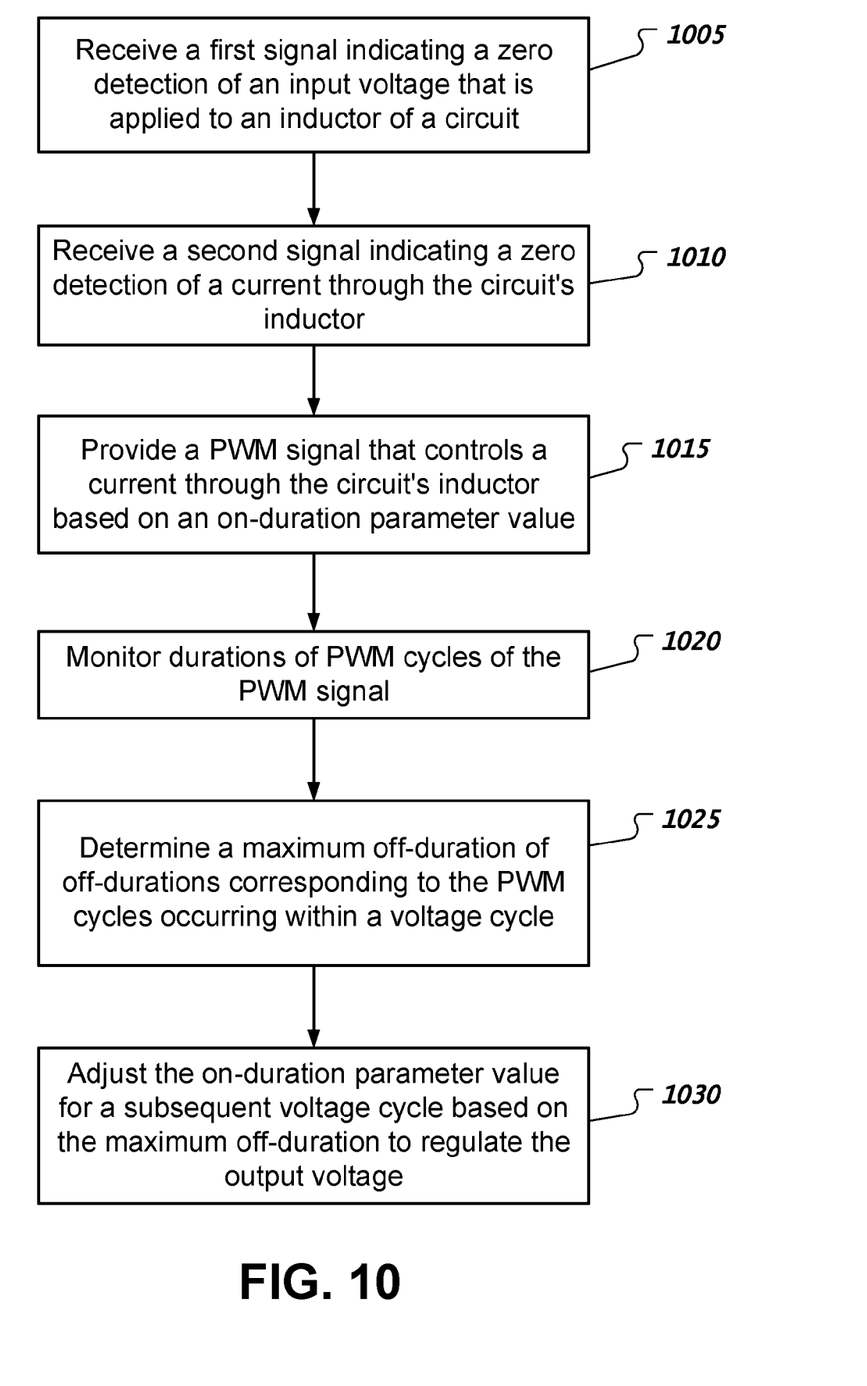
FIG. 10 shows an example of a process for power supply regulation.

FIG. 10 shows an example of a process for power supply regulation. At 1005, the process includes receiving a first signal indicating a zero detection of an input voltage that is applied to an inductor of a circuit. The circuit can be configured to produce an output signal with an output voltage that is responsive to the input voltage and an output of the inductor. At 1010, the process includes receiving a second signal indicating a zero detection of a current through the circuit's inductor. At 1015, the process includes providing a PWM signal that controls a current through the circuit's inductor based on an on-duration parameter value. The PWM signal can include PWM cycles that each include an on-duration and an off-duration. The on-duration parameter value can control the on-duration. A start of each on-duration can be triggered by a current trigger event indicated by the second signal. At 1020, the process includes monitoring durations of the PWM cycles of the PWM signal.

At 1025, the process includes determining a maximum off-duration of off-durations corresponding to the PWM cycles occurring within a voltage cycle. In some implementations, the process includes operating a timer counter, capturing a value of the timer counter based on the current trigger event, and resetting the timer counter based on the current trigger event. The process can include performing a comparison between a value of a register and the value of the timer counter, and loading the register with the value of the timer counter based on a result of the comparison. Determining the maximum off-duration maximum can include accessing the register. In some implementations, the process includes capturing a maximum duration of a PWM cycle that occurs during the first voltage cycle. The maximum off-duration can be determined based on the maximum duration and the on-duration parameter value in use during the maximum duration.

At 1030, the process includes adjusting the on-duration parameter value for a subsequent voltage cycle based on the maximum off-duration to regulate the output voltage. Adjusting the on-duration parameter value can include using a PID controller to gradually adjust the on-duration parameter. For example, the next on-duration parameter value can be based on the previous value plus an adjustment value, which can be a positive value, a negative value, or zero.

Figure 11:
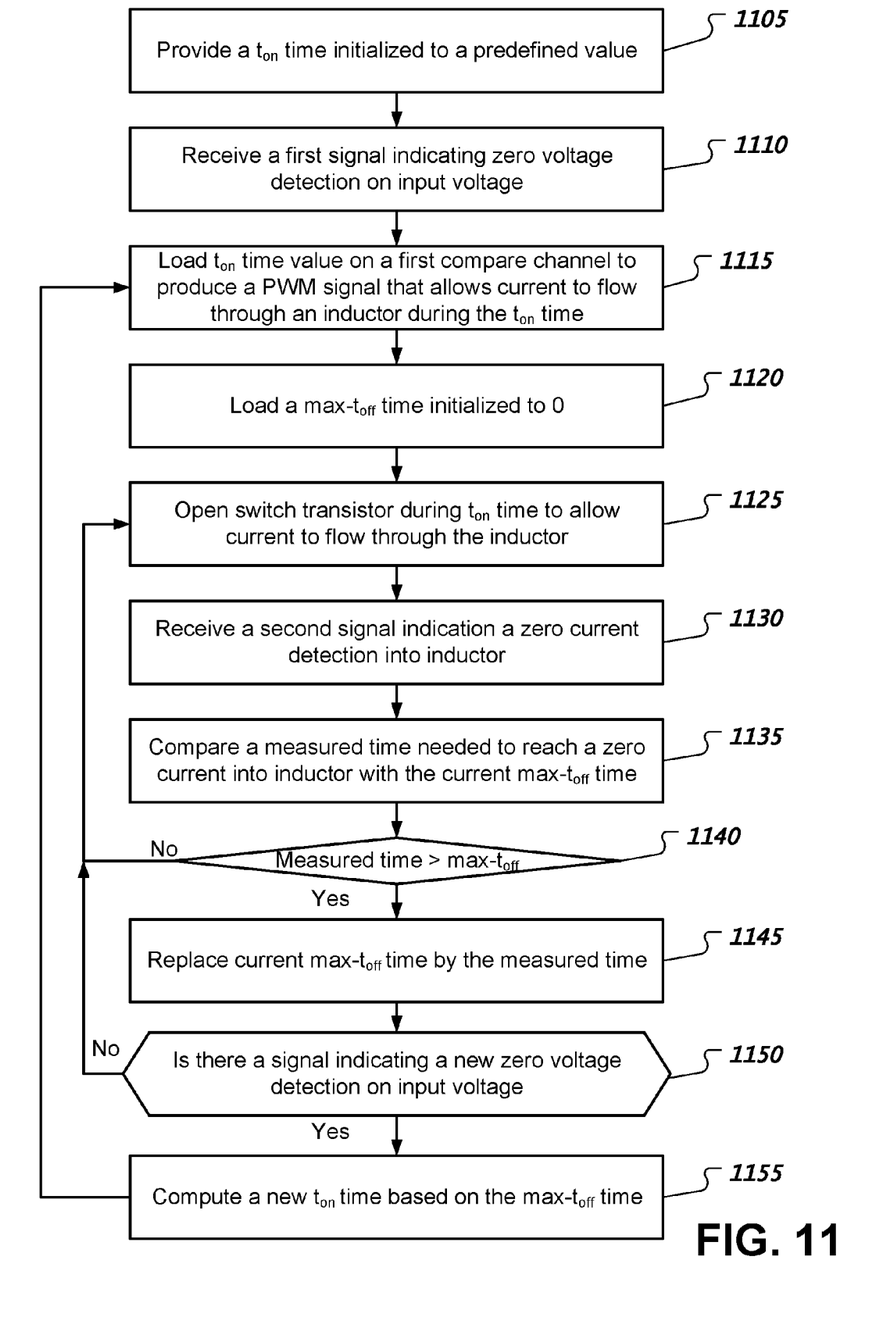
FIG. 11 shows another example of a process for power supply regulation.

FIG. 11 shows another example of a process for power supply regulation. At 1105, the process provides a $t_{on}$ time initialized to a predefined value. At 1110, the process receives a first signal indicating zero voltage detection on input voltage. At 1115, the process loads a $t_{on}$ time value on a first compare channel to produce a PWM signal that allows current to flow through an inductor during $t_{on}$ time. At 1120, the process loads a max-$t_{off}$ time initialized to 0. At 1125, the process opens a switch transistor during $t_{on}$ time to allow current to flow through an inductor. At 1130, the process receives a second signal indication a zero current detection into the inductor. At 1135, the process compares a measured time (e.g., a measured zero current delay) needed to reach a zero current into the inductor with the current max-$t_{off}$ time. At 1140, the process determines whether the measured time is greater than the max-$t_{off}$ value. If the measured time is not greater, then the process continues at 1125. If the measured time is greater, then the process continues at 1145. The process, at 1145, replaces the current max-$t_{off}$ time by the measured time. At 1150, the process checks to see if there is a signal indicating a new zero voltage detection on input voltage. If there is no such signal, then the process continues at 1125. If there is such a signal, at 1155, the process computes a new $t_{on}$ time based on the last max-$t_{off}$ time and the process continues at 1115.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A method comprising:
    receiving, by a controller, a first event signal provided by a power converter circuit, the first event signal based on an input signal to the power converter circuit crossing or reaching a first predetermined threshold;
    accessing, by the controller and based on the first event signal, information indicating a maximum duration of a pulse width modulation (PWM) cycle occurring within a first cycle of the input signal;
    determining, by the controller, a maximum off-duration based on the maximum duration of the PWM cycle and an on-duration parameter value;
    adjusting, by the controller, the on-duration parameter value for a second cycle of the input signal, the adjusting based on the maximum off-duration; and
    outputting, by the controller, a charging control signal to the power converter circuit based on the adjusted on-duration parameter value.

2. The method of claim 1, further comprising:
    receiving, by the controller, a second event signal provided by the power converter circuit, the second event signal indicating that current through an inductor of the power converter circuit is within a range; and
    triggering, by the controller, the outputting of the charging control signal based on the second event signal.

3. The method of claim 2, wherein determining the maximum duration of the PWM cycle includes starting and stopping a timer in response to the second event signal.

4. The method of claim 3, further comprising:
decrementing the timer from an initial value, where an amount of the decrement is a sum of the on-duration parameter value and a current off-duration;
determining that a current timer value is lower than a preceding timer value; and
responsive to the determining, causing the current off-duration to be stored as the maximum off-duration.

5. The method of claim 3, further comprising:
incrementing the timer from an initial value, where an amount of the increment is a sum of the on-duration parameter value and a current off-duration;
determining that a current timer value is higher than a preceding timer value; and
responsive to the determining, causing the current off-duration to be stored as the maximum off-duration.

6. The method of claim 1, wherein the input signal is a voltage signal.

7. The method of claim 1, wherein the power converter circuit includes power factor corrector (PFC) circuitry.

8. A controller comprising:
first circuitry operable to receive an event signal provided by a power converter circuit, the event signal based on an input signal to the power converter circuit crossing or reaching a predetermined threshold;
second circuitry operable to access information indicating a maximum duration of a pulse width modulation (PWM) cycle occurring within a first cycle of the input signal, determine a maximum off-duration based on the maximum duration of the PWM cycle and an on-duration parameter value and adjust the on-duration parameter value for a second cycle of the input signal based on the maximum off-duration; and
third circuitry operable to output a charging control signal to the power converter circuit based on the adjusted on-duration parameter value.

9. The controller of claim 8, further comprising:
receiving, by the controller, a second event signal provided by the power converter circuit, the second event signal indicating that current through an inductor of the power converter circuit is within a range; and
triggering, by the controller, the outputting of the charging control signal based on the second event signal.

10. The controller of claim 9, wherein determining the maximum duration of the PWM cycle includes starting and stopping a timer in response to the second event signal.

11. The controller of claim 10, further comprising:
decrementing the timer from an initial value, where an amount of the decrement is a sum of the on-duration parameter value and a current off-duration;
determining that a current timer value is lower than a preceding timer value; and
responsive to the determining, causing the current off-duration to be stored as the maximum off-duration.

12. The controller of claim 10, further comprising:
incrementing the timer from an initial value, where an amount of the increment is a sum of the on-duration parameter value and a current off-duration;
determining that a current timer value is higher than a preceding timer value; and
responsive to the determining, causing the current off-duration to be stored as the maximum off-duration.

13. The controller of claim 8, wherein the input signal is a voltage signal.

14. The controller of claim 8, wherein the power converter circuit includes power factor corrector (PFC) circuitry.

15. A controller comprising:
a pulse width modulation (PWM) circuit operable to:
receive a first event signal provided by a power converter circuit, the first event signal based on an input signal to the power converter circuit crossing or reaching a first predetermined threshold; and
output a charging control signal to the power converter circuit based on a first on-duration parameter value;
a processor unit operable to:
access, based on the first event signal, information indicating a maximum duration of a PWM cycle occurring within a first cycle of the input signal;
determine a maximum off-duration based on the maximum duration of the PWM cycle and the first on-duration parameter value; and
output a second on-duration parameter value for a second cycle of the input signal based on the maximum off-duration.

16. The controller of claim 15, further comprising:
receiving, by the PWM circuit, a second event signal provided by the power converter circuit, the second event signal indicating that current through an inductor of the power converter circuit is within a range; and
triggering, by the PWM circuit, the output of the charging control signal based on the second event signal.

17. The controller of claim 16, wherein determining the maximum duration of the PWM cycle includes starting and stopping a timer in response to the second event signal.

18. The controller of claim 17, further comprising:
decrementing the timer from an initial value, where an amount of the decrement is a sum of the first on-duration parameter value and a current off-duration;
determining that a current timer value is lower than a preceding timer value; and
responsive to the determining, causing the current off-duration to be stored as the maximum off-duration.

19. The controller of claim 17, further comprising:
incrementing the timer from an initial value, where an amount of the increment is a sum of the first on-duration parameter value and a current off-duration;
determining that a current timer value is higher than a preceding timer value; and
responsive to the determining, causing the current off-duration to be stored as the maximum off-duration.

20. The controller of claim 15, wherein the power converter circuit includes power factor corrector (PFC) circuitry.

* * * * *

UNITED STATES PATENT AND TRADEMARK OFFICE
CERTIFICATE OF CORRECTION

PATENT NO. : 9,917,505 B2  
APPLICATION NO. : 15/260246  
DATED : March 13, 2018  
INVENTOR(S) : Karl Jean-Paul Courtel It is certified that error appears in the above-identified patent and that said Letters Patent is hereby corrected as shown below:

In the Specification

Column 6, Line 41, replace "(e.g" with --(e.g.,--;

Column 8, Line 50, replace "TOP-$t_{out}$," with --TOP-$t_{on}$,--; and

Column 10, Line 57, replace "915" with --915.--.

Signed and Sealed this  
Sixth Day of July, 2021

Drew Hirshfeld  
*Performing the Functions and Duties of the*  
*Under Secretary of Commerce for Intellectual Property and*  
*Director of the United States Patent and Trademark Office*